United States Patent
König et al.

(10) Patent No.: US 6,849,244 B2
(45) Date of Patent: Feb. 1, 2005

(54) METHOD FOR PRODUCING HIGHLY-PURE GRANULAR SILICON

(75) Inventors: Theo König, Laufenberg (DE); Matthias Pfaffelhuber, League City, TX (US); Heiko Herold, Neuss (DE); Günter Holdenried, Leichlingen (DE); Leslaw Mleczko, Bochum (DE)

(73) Assignee: Solarworld Aktiengesellschaft, Bonn (DE)

( * ) Notice: Subject to any disclaimer, the term of this patent is extended or adjusted under 35 U.S.C. 154(b) by 0 days.

(21) Appl. No.: 10/432,154

(22) PCT Filed: Nov. 3, 2001

(86) PCT No.: PCT/EP01/12756

§ 371 (c)(1),
(2), (4) Date: Sep. 15, 2003

(87) PCT Pub. No.: WO02/40400

PCT Pub. Date: May 23, 2002

(65) Prior Publication Data

US 2004/0047795 A1 Mar. 11, 2004

(30) Foreign Application Priority Data

Nov. 20, 2000 (DE) .......................................... 100 57 481

(51) Int. Cl.$^7$ ................................................ C01B 33/02
(52) U.S. Cl. ........................ 423/350; 423/348; 423/349
(58) Field of Search ................................ 423/324, 348, 423/349, 350, 189

(56) References Cited

U.S. PATENT DOCUMENTS

| | | | |
|---|---|---|---|
| 3,012,861 A | 12/1961 | Ling | |
| 5,045,398 A | 9/1991 | Levin | |
| 5,264,183 A | * 11/1993 | Ebner et al. | .................. 422/83 |
| 5,906,799 A | 5/1999 | Burgie et al. | |
| 6,139,604 A | * 10/2000 | Gottzmann et al. | ............ 95/54 |

* cited by examiner

Primary Examiner—Stanley S. Silverman
Assistant Examiner—Colleen P. Cooke
(74) Attorney, Agent, or Firm—McGlew and Tuttles, P.C.

(57) ABSTRACT

The invention relates to a method for producing hyper-pure, granular silicon by decomposing a gas containing silicon in a reactor consisting of a silicon carbide-based, carbon-fiber reinforced material; to a corresponding reactor; and to the use of said reactor for producing silicon.

8 Claims, No Drawings

METHOD FOR PRODUCING HIGHLY-PURE GRANULAR SILICON

The present invention relates to a method for producing hyper-pure granular silicon by decomposition of silicic gases. Furthermore, the invention relates to an apparatus for the execution of this method and the application of such apparatus.

Silicic gases as referred to herein are silicon compounds or mixtures of silicon compounds which under the conditions according to the invention can be decomposed in the gaseous phase depositing silicon. Silicon-free gases in the meaning of this invention are gases which do not contain any silicon compounds.

For the production of elemental silicon with a purity allowing its being used in the photovoltaic area and/or in semiconductor technology, methods of thermal decomposition of volatile silicon compounds are known. Such thermal decomposition can be carried out, for example, in fluidized-bed reactors in that small silicon particles are provided which are then fluidized by an appropriate silicic gas or gas mixture flowing into the reactor, whereby the gases in the gas mixture can be silicic, but also silicon-free gases. Ideally, the thermal decomposition of such volatile silicon compounds shall occur exclusively on the surface of the small silicon particles provided.

U.S. Pat. No. 3,012,861 discloses such a method for the manufacture of elemental silicon in a fluidized-bed reactor. The silicon compounds used are silanes and halosilanes, which can be diluted by other gases. Suitable gases for dilution are, for example, argon or helium, in the case of silane also hydrogen can be used. The reaction can be carried out in a large range of pressures. When undiluted $SiH_4$ or $SiL_4$ is used as silicon compound, it is preferred to carry out the reaction at a low pressure.

In order to obtain silicon of the desired high purity, components from the reactor shell must be prevented from entering the reaction chamber and contaminating the produced silicon. To this end, the employed reactors are usually provided with a coating on their interior surface, particularly with a silicon or silicon carbide coating. Thus, for example, reactors made of graphite and provided with silicon carbide coating on their interior surface can be used. When using reactors made of silica glass an interior coating is not required because usually silica glass does not contain any components that contaminate the produced silicon.

Reactors made of graphite or silica glass, however, are disadvantageous for the industrial production of hyper-pure granular silicon by decomposition of silicic gases, because the possible reactor size is strongly limited by the respective material properties.

In addition to this, graphite does not provide the desired gasproofness, so that reactors made of graphite must be provided with a suitable interior coating in order to prevent silicic gases or silicon-free gases from diffusing out of the reactor.

The object of the present invention was to provide a method for the manufacture of hyper-pure granular silicon by decomposition of a silicic gas in a reactor that is free of the above specified disadvantages and is characterized particularly by gasproofness, high thermal conductivity, high purity of the material and low cracking sensitivity.

Therefore the invention relates to a method for producing hyper-pure granular silicon by decomposition of a silicic gas carried out in a reactor consisting of a silicon carbide-based carbon-fibre reinforced material.

The reactor to be employed according to the invention consisting of carbon-fibre reinforced silicon carbide is characterized among others by wear resistance, mechanical stability at low wall thickness as well as high thermal conductivity and gasproofness.

Preferably the reactor consists of carbon-fibre reinforced silicon carbide.

Preferably the reactor to be employed according to the invention is constructed such that thermally insulating areas at the bottom of the reactor as well as at the reactor head consist of a carbon-fibre reinforced silicon carbide material with low thermal conductivity, while all other areas are made of a carbon-fibre reinforced silicon carbide material with high thermal conductivity.

Particularly preferred the reactor to be employed according to the invention is constructed such that thermally insulating areas at the bottom of the reactor as well as at the reactor head consist of a carbon-fibre reinforced silicon carbide material with carbon excess, while all other areas are made of a carbon-fibre reinforced silicon carbide with silicon excess.

Suitable carbon-fibre reinforced silicon carbide materials are known and commercially available, for example, from IABG mbH and/or Daimler-Benz Aerospace (Dornier) under the name C/SiC®.

Suitable carbon-fibre reinforced silicon carbide materials with carbon excess contain, for example, 30 to 50 volume percent, preferably 35 to 45 volume percent carbon fibres and 30 to 50 volume percent, preferably 35 to 45 volume percent silicon carbide. The missing percentage of 100 volume percent are preferably pores. It is also possible, however, that the carbon-fibre reinforced silicon carbide material with carbon excess includes other components in addition to the carbon fibres and silicon carbide, e.g. silicon nitride or contaminations of up to 5 volume percent.

Preferably the carbon-fibre reinforced silicon carbide material with carbon excess is a material with the commercial name C/SiC® Typ 16 supplied by Daimler-Benz Aerospace (Dornier). Such material includes approx. 40 volume percent carbon fibres and approx. 40 volume percent silicon carbide with the remaining volume of material being pores. The thermal conductivity of such material is very low amounting to 2 to 5 W/mK.

Suitable carbon-fibre reinforced silicon carbide materials with silicon excess contain, for example, 20 to 40 volume percent, preferably 25 to 35 volume percent carbon fibres which are enclosed in silicon carbide. The missing percentage of 100 volume percent is preferably silicon. It is also possible that the carbon-fibre reinforced silicon carbide material with silicon excess includes other components in addition to the carbon fibres and silicon carbide, e.g. silicon nitride or contaminations of up to 5 volume percent.

Preferably the carbon-fibre reinforced silicon carbide material with silicon excess is a material with the commercial name C/SiC® Typ V32 supplied by IABG. Such material includes approx. 30 volume percent carbon long fibres with a fibre coating of silicon carbide with the remaining volume of material being silicon. The thermal conductivity of such material is high and amounts to 70 W/mK.

In order to produce carbon-fibre reinforced ceramic materials on the basis of silicon carbide with silicon excess carbon fibres, for example, can be soaked in resin binder first, and then pressed and cured at temperatures of approx. 2000° C. The resulting fibre-reinforced carbon is subsequently in-filtered with liquid silicon under a vacuum and at temperatures of approx. 1500° C.

In order to produce carbon-fibre reinforced ceramic materials on the basis of silicon carbide with carbon excess, for example, a ceramic matrix can be generated from siliconorganic polymers and ceramic fillers. Suitable ceramic fillers are, for example, silicon nitride or carbon. The resulting slip can be used—analogous to methods for fibre-reinforced plastics—to impregnate suitable fibres, e.g. carbon fibres, by techniques such as wrapping, infiltration or laminating. The resulting raw body can be cured subsequently in an autoclave at a temperature from 200 to 300° C. and a pressure from 10 to 20 bar; the resulting product is a solid, mechanically workable green body. In a subsequent pressureless protective gas pyrolysis at temperatures above 1100° C. the polymers are finally transformed to the desired carbon-fibre reinforced ceramic materials.

The method according to the invention can be carried out in different types of reactors, provided that according to the invention the reactor consists of carbon-fibre reinforced material on the basis of silicon carbide. The application of a fluidized-bed reactor is preferred. Appropriate reactors, particularly fluidized-bed reactors are already known. By way of example reactors providing a bubbling or circulating fluidized bed may be mentioned, further spouted bed reactors and downpipe reactors. The method can be carried out, for example, continuously or discontinuously. A continuous process is preferred.

The reactor dimensions can be largely varied and can be optimally adjusted to the desired reaction conditions. Thus the method according to the invention can be carried out easily at a temperature of approx. 800° C. and a pressure of approx. 200 mbar in a cylindrical reactor with a diameter of approx. 2000 mm if the reactor wall consists of carbon-fibre reinforced silicon carbide with a thickness of approx. 10–20 mm. Such reactor diameters cannot be realized, for example, when reactors made of quartz are employed.

The produced hyper-pure granular silicon can be discharged from the used reactor, for example, continuously or intermittently.

Silicic gases to be employed can be silanes, silicon iodides and halosilanes of chlorine, bromine and iodine. Also mixtures of the named compounds can be employed. It is irrelevant whether the silicon compound is already rendered in gaseous form at room temperature or needs to be transformed into gaseous condition first. The transformation to gaseous condition can be carried out thermally for example.

The use of silanes is preferred. By way of example $SiH_4$, $Si_2H_6$, $Si_3H_8$, $Si_4H_{10}$ and $Si_6H_{14}$ may be named. Particularly preferred is $SiH_4$.

The pressure prevailing during the execution of the method according to the invention is largely uncritical. It is preferred, however, to work at pressures from 50 to 5000 mbar. All pressure values specified refer to the absolute pressure. If the method according to the invention is carried out in a fluidized-bed reactor the pressure specified above is to be understood as the pressure prevailing behind the fluidized bed as seen in flow direction of the introduced gas mixture.

It is possible to carry out the method according to the invention for the manufacture of hyper-pure granular silicon by adding a silicon-free gas or a mixture of several silicon-free gases. For example, the amount of silicon-free gas added can be 0 to 90 volume percent, preferably 0 to 50 volume percent, based on the total amount of gas introduced. Adding silicon-free gas reduces the formation of silicon dust upon thermal decomposition of the silicic gas. It is also possible, however, to do without any addition of silicon-free gas.

Suitable silicon-free gases are, for example, noble gases, nitrogen and hydrogen, the silicon-free gases being applicable each gas individually or any combination of them. Nitrogen and hydrogen are preferred, hydrogen is particularly preferred.

Temperature can be varied in the temperature range from 300° C. to 1400° C. The temperature must be high enough, however, to ensure the decomposition of the silicic gas and must not exceed the melting temperature of the produced silicon. In case of $SiH_4$ being used the advantageous temperature range is between 500° C. and 1400° C. A decomposition temperature from 600° C. to 1000° C. is preferred, particularly preferred 620° C. to 800° C. In case of $SiI_4$ being used the respective range is between 850° C. and 1250° C., for halosilanes between 500° C. and 1400° C.

In a preferred embodiment of the method according to the invention solid particles—hereinafter referred to as particles—are provided in the reactor zone of a fluidized-bed reactor made of carbon-fibre reinforced silicon carbide. These particles can be introduced from the exterior at intervals or continuously. These particles can also be particles which are generated in the reaction zone. The particles form a fixed bed through to which the introduced gas is streamed. The stream-in velocity of the introduced gas is adjusted such that the fixed bed is fluidized and a fluidized bed develops. The respective procedure is generally known to the skilled person. The stream-in velocity of the introduced gas must correspond to at least the loosening velocity. Loosening velocity in this case is to be understood as the velocity at which a gas streams through a bed of particles and below which the fixed bed is maintained, i.e. below which the bed particles remain largely fixed. Above this velocity the bed starts fluidizing, i.e. the bed particles move and bubbles begin to emerge.

The stream-in velocity of the introduced gas in this preferred embodiment is one to ten times the loosening velocity, preferably one and a half to seven times the loosening velocity.

Preferably particles of a diameter of 50 to 5000 $\mu$m are used.

The particles used are preferably silicon particles. Preferably such silicon particles have a purity corresponding to the one desired for the produced hyper-pure granular silicon. It is also possible, however, to use silicon particles with a certain doping level if doped material is desired. Also particles not consisting of silicon are suitable provided they are stable under the said reaction conditions.

The invention relates furthermore to a method for producing hyper-pure granular silicon by decomposition of a silicic gas wherein said reactor consists of a silicon carbide-based carbon-fibre reinforced material.

Preferably the reactor consists of carbon-fibre reinforced silicon carbide.

Preferably the reactor according to the invention is constructed such that thermally insulating areas at the bottom of the reactor as well as at the reactor head consist of a carbon-fibre reinforced silicon carbide material with low thermal conductivity, while all other areas are made of a carbon-fibre reinforced silicon carbide with high thermal conductivity.

Particularly preferred the reactor according to the invention is constructed such that thermally insulating areas at the bottom of the reactor as well as at the reactor head consist of a carbon-fibre reinforced silicon carbide material with carbon excess, while all other areas are made of a carbon-fibre reinforced silicon carbide with silicon excess.

Suitable carbon-fibre reinforced ceramic silicon carbide materials are known and commercially available, for example, from IABG mbH and/or Daimler-Benz Aerospace (Dornier) under the name C/SiC®.

Suitable carbon-fibre reinforced silicon carbide materials with carbon excess contain, for example, 30 to 50 volume percent, preferably 35 to 45 volume percent carbon fibres and 30 to 50 volume percent, preferably 35 to 45 volume percent silicon carbide. The missing percentage of 100 volume percent are preferably pores. It is also possible, however, that the carbon-fibre reinforced silicon carbide material with carbon excess includes other components in addition to the carbon fibres and silicon carbide, e.g. silicon nitride or contaminations of up to 5 volume percent.

Preferably the carbon-fibre reinforced silicon carbide material with carbon excess is a material with the commercial name C/SiC® Typ 16 supplied by Daimler-Benz Aerospace (Dornier). Such material includes approx. 40 volume percent carbon fibres and approx. 40 volume percent silicon carbide with the remaining volume of material being pores. The thermal conductivity of such material is very low amounting to 2 to 5 W/mK.

Suitable carbon-fibre reinforced silicon carbide materials with silicon excess contain, for example, 20 to 40 volume percent, preferably 25 to 35 volume percent carbon fibres which are enclosed in silicon carbide. The missing percentage of 100 volume percent is preferably silicon. It is also possible that the carbon-fibre reinforced silicon carbide material with silicon excess includes other components in addition to the carbon fibres and silicon carbide, e.g. silicon nitride or contaminations of up to 5 volume percent.

Preferably the carbon-fibre reinforced silicon carbide material with silicon excess is a material with the commercial name C/SiC® Typ V32 supplied IABG. Such material includes approx. 30 volume percent carbon long fibres with a fibre coating of silicon carbide with the remaining volume of material being silicon. The thermal conductivity of such material is high and amounts to 70 W/mK.

In a particular embodiment of the reactor the thermally insulating areas at the reactor head. i.e. the cover of the reactor, are constructed massively or in several layers, preferably in two layers, with adjacently arranged hollow bodies or hollow spaces being provided between such layers. Preferably the layers consists of the same material and contain hollow spaces. Preferably the hollow bodies or hollow spaces have a rectangular cross section and are arranged such that their sides are flush with each other and that they are flush with the layers at the upper and lower ends. Such structure of reactor cover ensures a particularly good thermal insulation.

In the bottom area, it is preferred to use a thin ring of C/SiC® Typ 16 material supplied by Daimler-Benz Aerospace (Dornier) with a thickness of approx. 1 to 100 mm as thermally insulating layer on the cooled reactor bottom.

Preferably the reactor according to the invention is a fluidized-bed reactor.

Preferably the reactor consists of gasproof carbon-fibre reinforced silicon carbide material.

The reactor according to the invention is preferably used to carry out the method according to the invention. A number of other applications are also conceivable where the application of the apparatus according to the invention can be of great advantage. By way of example the manufacture of silicon by thermal decomposition on a silicon rod according to the so-called Siemens method may be mentioned.

What is claimed is:

1. A method for producing hyper-pure granular silicon by decomposition of a silicic gas carried out in a reactor consisting of a silicon carbide-based carbon-fibre reinforced material.

2. A method according to claim 1, wherein the silicic gases employed are at least one of silanes, silicon iodides and halosilanes of chlorine, bromine and iodine.

3. A method according to claim 1, wherein the silicic gas used is $SiH_4$.

4. A method according to claim 1, wherein the reactor used is a fluidized-bed reactor, with solid particles being provided in the reactor zone which form a fluidized bed and the decomposition of the introduced silicic gas occurring on these solid particles.

5. A method according to claim 4, wherein the solid particles are silicon particles.

6. A reactor for the manufacture of hyper-pure granular silicon by decomposition of a silicic gas, wherein the reactor comprises: a silicon carbide-based carbon-fibre reinforced material; a bottom of the reactor; and a reactor head, wherein the thermally insulating areas at the bottom of the reactor as well as at the reactor head consist of a carbon-fibre reinforced silicon carbide material with low thermal conductivity, while all other areas are made of a carbon-fibre reinforced silicon carbide material with high thermal conductivity.

7. The reactor according to claim 6, wherein the reactor consists of a carbon-fibre reinforced silicon carbide.

8. A reactor for the manufacture of hyper-pure granular silicon by decomposition of a silicic gas, wherein the reactor comprises a silicon carbide-based carbon-fibre reinforced material; and thermally insulating areas at the bottom of the reactor as well as at the reactor head consists of a carbon-fibre reinforced silicon carbide material with carbon excess, while all other areas are made of a carbon-fibre reinforced silicon carbide material with silicon excess.

* * * * *